(12) United States Patent
More et al.

(10) Patent No.: US 8,172,274 B2
(45) Date of Patent: May 8, 2012

(54) SEALING JOINT FOR CONNECTING ADJOINING DUCT PIECES IN AN ENGINE EXHAUST SYSTEM

(75) Inventors: Dominick G. More, Middletown, CT (US); Kenneth W. Cornett, Ivoryton, CT (US); Paul A. Dudzinski, East Berlin, CT (US); Jeremy M. Payne, New Haven, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 433 days.

(21) Appl. No.: 12/499,423

(22) Filed: Jul. 8, 2009

(65) Prior Publication Data

US 2010/0028075 A1 Feb. 4, 2010

Related U.S. Application Data

(60) Provisional application No. 61/084,752, filed on Jul. 30, 2008.

(51) Int. Cl.
*F16L 21/00* (2006.01)
(52) U.S. Cl. ........................ 285/233; 285/146.3; 285/302
(58) Field of Classification Search .................. 285/233, 285/298, 300, 261, 145.3, 146.1, 146.3, 234, 285/422, 302
See application file for complete search history.

(56) References Cited

U.S. PATENT DOCUMENTS

| | | | |
|---|---|---|---|
| 3,689,114 A | 9/1972 | Meserole | |
| 3,930,071 A | 12/1975 | Rao et al. | |
| 4,097,071 A | 6/1978 | Crawford et al. | |
| 4,209,177 A | 6/1980 | Hall | |
| 4,218,067 A * | 8/1980 | Halling | 277/605 |
| 4,553,775 A * | 11/1985 | Halling | 285/261 |
| 4,644,747 A * | 2/1987 | Petersen | 285/261 |
| 4,747,624 A | 5/1988 | Faber et al. | |
| 4,871,181 A | 10/1989 | Usher et al. | |
| 5,462,291 A | 10/1995 | Maeda et al. | |
| 5,772,254 A | 6/1998 | Felber et al. | |
| 6,109,662 A | 8/2000 | van Zuthem et al. | |

(Continued)

FOREIGN PATENT DOCUMENTS

GB 2083154 3/1982

(Continued)

OTHER PUBLICATIONS

Extended European Search Report for corresponding application No. EP 10159566.8 dated Jul. 21, 2010.

(Continued)

*Primary Examiner* — David E Bochna
(74) *Attorney, Agent, or Firm* — Renner, Otto, Boiselle & Sklar, LLP

(57) ABSTRACT

An engine exhaust system comprises duct pieces ($20_1$, $20_2$) and a sealing joint (30) for interconnecting their adjoining ends. The sealing joint (30) comprises a one-piece tubular body (31) including a first axial end portion ($33_1$), a second axial end portion ($33_2$), and a bridge portion (34) extending therebetween. The first end portion ($33_1$) is at least partially positioned within a female recess ($23_1$) of the first duct piece ($20_1$) and the second end portion ($33_2$) is at least partially positioned within a female recess ($23_2$) of the second duct piece ($20_2$). Depending upon the thermal expansion-contraction conditions in the exhaust system, the bridge portion (34) can extend across a gap (24) and/or it can be positioned partially within female recesses ($23_1$) and ($23_2$).

19 Claims, 4 Drawing Sheets

U.S. PATENT DOCUMENTS

| | | | |
|---|---|---|---|
| 6,129,362 | A | 10/2000 | Kahima et al. |
| 6,152,453 | A | 11/2000 | Kahima et al. |
| 6,220,605 | B1 | 4/2001 | Becker, Jr. |
| 6,293,098 | B1 | 9/2001 | Coates |
| 6,302,402 | B1 | 10/2001 | Rynders et al. |
| 6,517,086 | B1 | 2/2003 | Jamrog |
| 6,672,594 | B2 | 1/2004 | Kozerski |
| 6,709,023 | B2 * | 3/2004 | French .................. 285/300 |
| 6,860,487 | B2 | 3/2005 | Shiokawa et al. |
| 7,063,330 | B2 | 6/2006 | Kubota et al. |
| 7,172,202 | B2 | 2/2007 | Kubota et al. |
| 7,328,685 | B2 | 2/2008 | Mockenhaupt et al. |
| 7,556,295 | B2 * | 7/2009 | Holzheu .................. 285/231 |
| 2006/0272321 | A1 | 12/2006 | Mockenhaupt et al. |
| 2007/0240409 | A1 | 10/2007 | Bassani |
| 2007/0257443 | A1 | 11/2007 | Kubota et al. |
| 2007/0284828 | A1 | 12/2007 | Komukai et al. |
| 2008/0017269 | A1 | 1/2008 | Gudenburr et al. |
| 2008/0289323 | A1 | 11/2008 | Diez et al. |

FOREIGN PATENT DOCUMENTS

| | | |
|---|---|---|
| GB | 2138904 | 10/1984 |
| JP | 2005127391 | 5/2005 |

OTHER PUBLICATIONS

European Search Report for corresponding application No. EP09165847.6 dated May 11, 2009.

Partial European Search Report for corresponding application No. EP 10159566.8 dated May 12, 2010.

* cited by examiner

SEALING JOINT FOR CONNECTING ADJOINING DUCT PIECES IN AN ENGINE EXHAUST SYSTEM

RELATED APPLICATION

This application claims priority under 35 U.S.C. §119 (e) to U.S. Provisional Patent Application No. 61/084,752 filed on Jul. 30, 2008. The entire disclosure of this provisional application is hereby incorporated by reference. If incorporated-by-reference subject matter is inconsistent with subject matter expressly set forth in the written specification (and/or drawings) of the present disclosure, the latter governs to the extent necessary to eliminate indefiniteness and/or clarity-lacking issues.

BACKGROUND

An engine exhaust system typically comprises ductwork with a plurality of duct pieces that are connected together to form conveyance passages for exhaust gasses. For example, a duct piece can be fixed to the exhaust manifold head (and aligned with one or more exhaust ports) and connected to other duct pieces to convey exhaust gas to a vehicle's outlet pipe. If the engine includes an EGR (i.e., exhaust gas recirculation) design, duct pieces can be interconnected to convey exhaust gas back into the air intake line for reintroduction into the combustion chamber. Such a multi-piece construction of the ductwork allows the engine exhaust system to accommodate the thermal expansion-contraction that occurs during engine warm-up, operation, and/or cool-down.

SUMMARY

A sealing joint is provided for interconnecting a duct pieces in an engine exhaust system. The sealing joint is adapted to accommodate a female-to-female interconnection between duct pieces and it has a continuous circumferential construction. Accordingly, there are no inherent leak paths through which exhaust gas can escape upstream of emission-control devices (e.g., catalytic converter, particle collector, etc.).

DRAWINGS

DESCRIPTION

Figure 1:
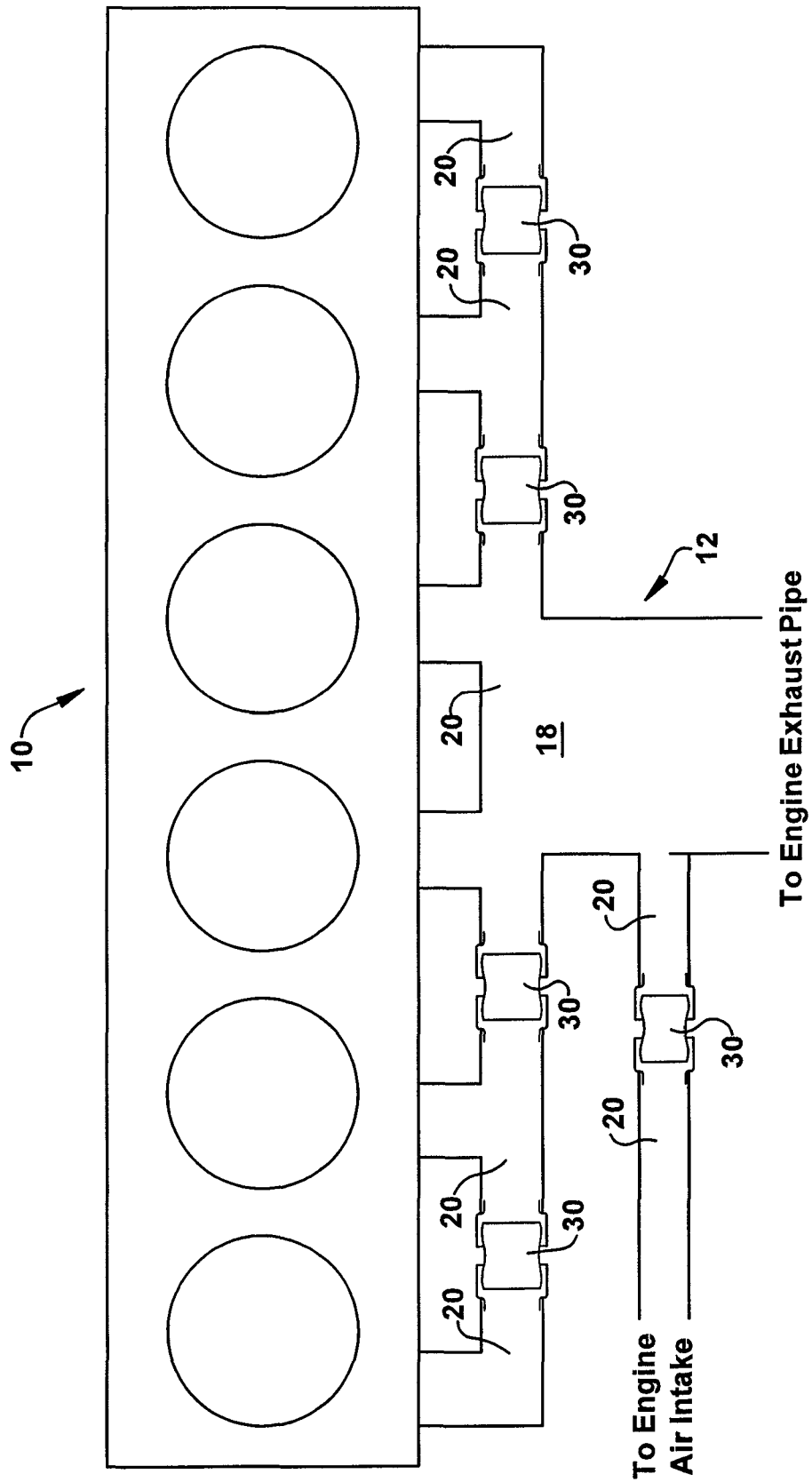
FIG. 1 is a schematic drawing of an engine incorporating the sealing joint in its ductwork.

An engine 10 (e.g., a six-cylinder diesel engine) is shown schematically in FIG. 1. The engine 10 includes an exhaust system 12 comprising ductwork 18 with a plurality of duct pieces 20 that are connected together form conveyance passages for exhaust gasses. For example, a plurality of the duct pieces 20 can be interconnected to form an exhaust manifold head that discharges to an exit passage to convey exhaust combustion gas to a vehicle's exhaust pipe. If the engine 10 includes an EGR (i.e., exhaust gas recirculation) design, certain duct pieces 20 can be interconnected to convey a portion of the exhaust gas back to the engine's air intake.

Adjoining duct pieces 20 in the engine exhaust system 12 are interconnected by sealing joints 30. The multi-piece construction of the ductwork, and the interconnection of the duct pieces 20 by the sealing joints 30, allows the exhaust system 12 to accommodate the thermal expansion-contraction that occurs during engine warm-up, operation, and/or cool-down. The sealing joints 30 compensate for movement of the duct pieces towards and away from each other during heating and cooling, without compromising any sealing capacity.

Figure 2:
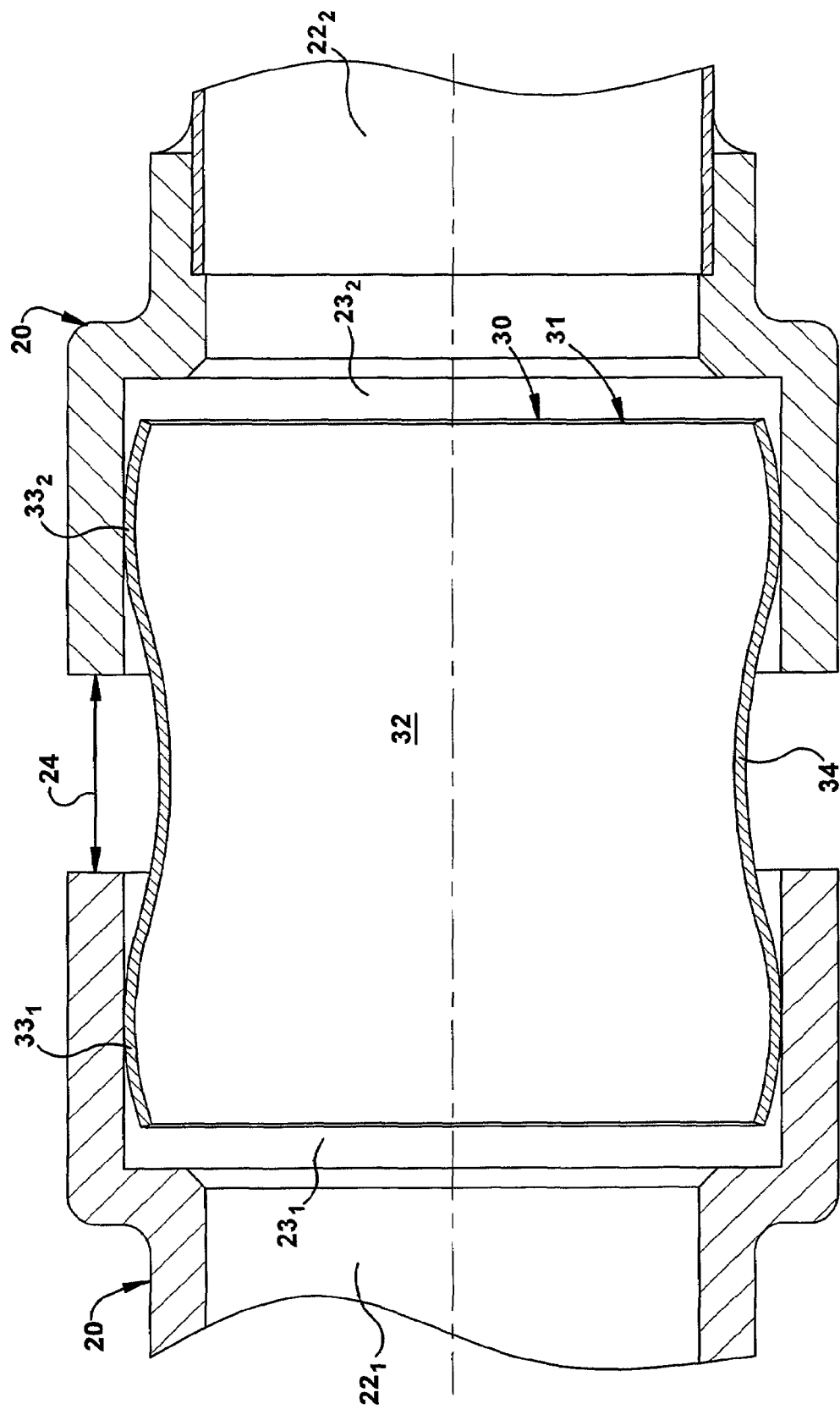
FIG. 2 is a sectional view of the sealing joint and the adjoining ends of the duct pieces interconnected thereby.

Referring now to FIG. 2, adjoining duct pieces 20 and their interconnecting sealing joint 30 is shown in more detail. The first duct piece $20_1$ includes a passage $22_1$ for conveying combustion gas and a female recess $23_1$, coextensive with the passage $22_1$, on its adjoining end. The second duct piece $20_2$, includes a passage $22_2$ for conveying combustion gas and a female recess $23_2$, coextensive with the passage $22_2$, on its adjoining end. The axial end faces of the adjoining duct pieces 20 created a female-to-female connection arrangement and they can be separated by a gap 24 that lengthens/shortens during thermal expansion/contraction of engine parts.

The sealing joint 30 comprises a one-piece tubular body 31 having a passage 32 extending axially therethrough. The sealing joint 32 includes a first axial end portion $33_1$, a second axial end portion $33_2$ and a bridge portion 34 extending therebetween. The first end portion $33_1$ is at least partially positioned within the female recess $23_1$ of the first duct piece $20_1$ and the second end portion $33_2$ is at least partially positioned with the female recess $23_2$ of the second duct piece $20_2$. The bridge portion 34 extends across the gap 24 and/or is positioned partially within female recesses $23_1$ and $23_2$, depending upon the engine's thermal conditions.

In the engine exhaust system 12, combustion gas passes through the passage $22_1$ of the first duct piece $20_1$, through the passage 32 in the sealing joint 30, and then through the passage $22_2$ of the second duct piece $20_2$. The sealing joint 30 does not have interruptions in its circumferential surfaces (as opposed to, for example, a sealing joint comprising a slip ring). Accordingly, there are no inherent leak paths through which exhaust gas can escape upstream of emission-control devices (e.g., catalytic converter, particle collector, etc.).

Figure 3:
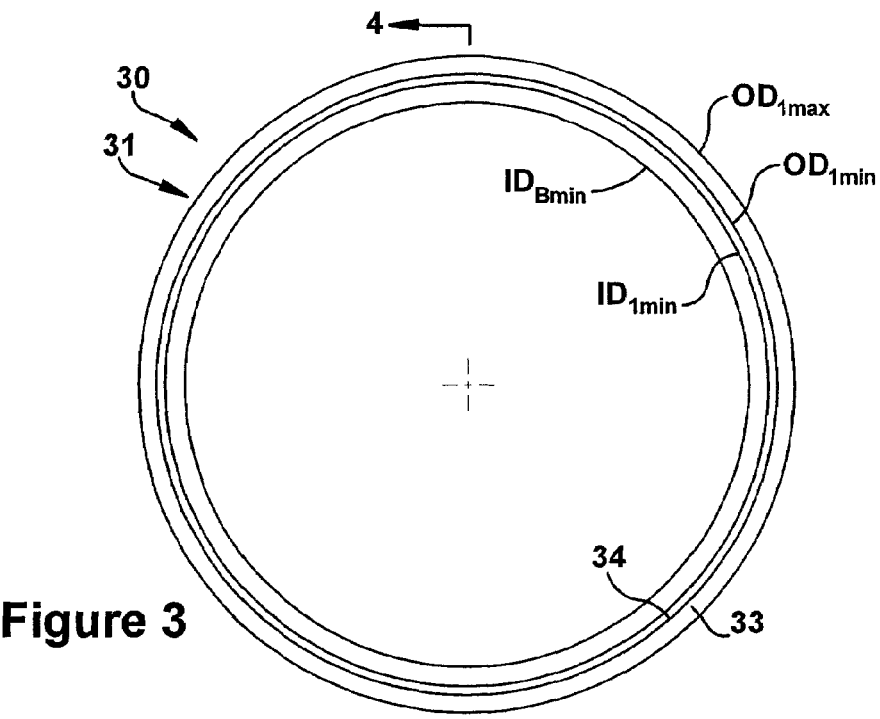
FIG. 3 is a front axial view of the sealing joint isolated from the duct pieces.
Figure 4:
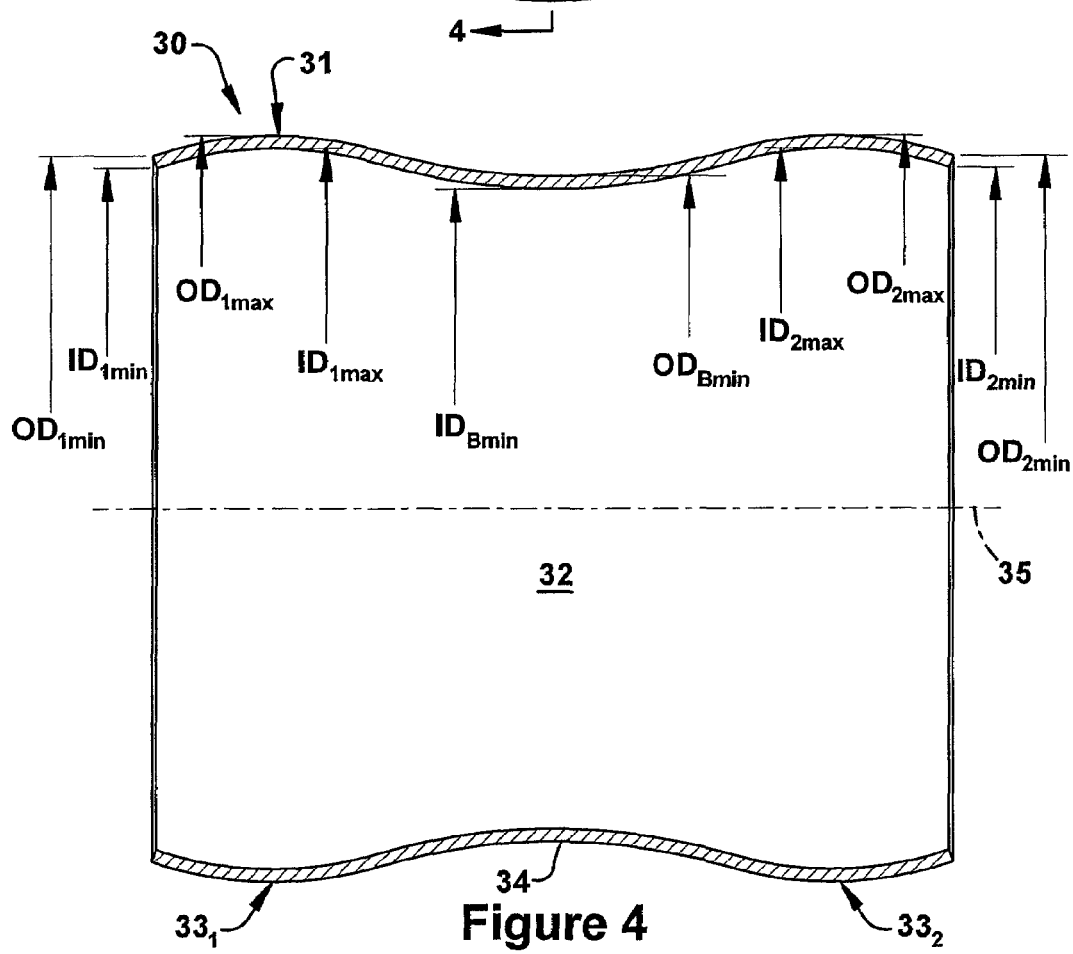
FIG. 4 is a sectional view of the sealing joint as taken along line 4-4 in FIG. 3.

Referring now to FIGS. 3-4, the sealing joint 30 is shown isolated from the engine's ductwork 18. The geometry of the tubular body 31 resembles a fat hourglass, with its end portions 33 corresponding to the upper/lower sand bulbs and its bridge portion 34 corresponding to the union therebetween. (The bridge portion 34 is relatively wide when compared to the bottleneck of a conventional hourglass shape.)

The portions $33_1$, $33_2$, and 34 can be coaxially convex and/or concave. In words, the tubular body 31 can be symmetrical about a series of planes passing through its longitudinal axis 35. An outer surface is "concave" or "convex" as viewed from outside the tubular body 31. An inner surface is "concave" or "convex" as viewed from inside the passage 32.

More particularly, the first end portion $33_1$ has a coaxially convex outer profile with a maximum outer diameter $OD_{1max}$ and a minimum outer diameter $OD_{1min}$, and it has a coaxially concave inner profile with a maximum inner diameter $ID_{1max}$ and a minimum inner diameter $ID_{1min}$. The second end portion $33_2$ has a coaxially convex outer profile with a maximum outer diameter $OD_{2max}$ and a minimum outer diameter $OD_{2max}$, and it has a coaxially concave inner profile with a maximum inner diameter $ID_{2max}$ and minimum inner diameter $ID_{2min}$. The bridge portion 34 has a coaxially concave outer profile with a minimum outer diameter $OD_{Bmin}$ and a coaxially convex inner profile with a minimum inner diameter $ID_{Bmin}$.

The bridge's minimum outer diameter $OD_{Bmin}$ is less than the maximum outer diameter $OD_{1max}$ of the first end portion $33_1$ and it is less than the maximum outer diameter $OD_{2max}$ of the second end portion $33_2$. The bridge's minimum inner diameter $ID_{Bmin}$ can be less than the maximum inner diameter $ID_{1max}$ of the first end portion $33_1$ and/or it can be less than the maximum inner diameter $ID_{2max}$ of the second end portion $33_2$. Alternatively, the bridge's minimum inner diameter $ID_{Bmin}$ can be not less than the maximum inner diameter $ID_{1max}$ of the first end portion $33_1$ and/or it can be not less than the maximum inner diameter $ID_{2max}$ of the second end portion $33_2$.

The tubular body 31 can have a constant thickness throughout its portions $33_1$, $33_2$, 34. If so, the difference between the inner diameters and the difference between the outer diameters will be the substantially the same. In other words, for example, the inner-outer diameter differences ($OD_{1max}$-$ID_{1max}$ and $OD_{1min}$-$ID_{1min}$) of the first end portion $33_1$, the inner-outer diameter differences ($OD_{2max}$-$ID_{2max}$ and $OD_{2min}$-$ID_{2min}$) of the second end portion $33_2$, and the inner-outer diameter difference ($OD_{Bmin}$-$ID_{Bmin}$) of the bridge portion 34 can all be approximately equal.

The maximum outer diameters ($OD_{1max}$ and $OD_{2max}$) of the end portions 33 are each sized to contact the inner wall of the female recess 23 in the respective duct piece 20. (See FIG. 2.) If the recess $23_1$ and the recess $23_2$ are of a similar shape, the end portions 33 can be symmetrical relative to each other about the bridge portion 34. Specifically, for example, the maximum outer diameter $OD_{1max}$ of the first end portion $33_1$ and the maximum outer diameter $OD_{2max}$ of the second end portion $33_2$ can be approximately equal. Likewise, the minimum outer diameter $OD_{1min}$ of the first end portion $33_1$ and the minimum outer diameter $OD_{2min}$ of the second end portion $33_2$ can be approximately equal. And the inner diameters ($ID_{1max}$ and $ID_{1min}$) of the first end portion $33_1$ can be approximately equal to the inner diameters ($ID_{2max}$ and $ID_{2min}$) of the second end portion $33_2$.

In certain ductwork 18 (and/or with some duct pieces 20), the recess $23_1$, and the recess $23_2$ may be of different sizes and/or shapes. If so, the end portions 33 of the sealing joint 30 can be adapted to accommodate the respective recesses 23. With non-similar duct pieces, the end portions 33 may not be symmetrical about the bridge portion 34. (But the portions $33_1$, $33_2$, and 34 can still be coaxially convex-concave and/or symmetrical about a series of planes passing through the longitudinal axis 35 of the tubular body 31).

The minimum outer diameter $OD_{1min}$ of the first end portion $33_1$ and the minimum outer diameter $OD_{2min}$ of the second end portion $33_2$ can be located near or at the portions' respective distal (i.e., bridge-remote) edges. This geometry may facilitate insertion of the end portion 33 into the female recess 23 of the corresponding duct piece 20.

The tubular body 31 can be made from a metal and/or a metal alloy (e.g., stainless steel, carbon steel, etc.). A cylindrical tube segment (e.g., cut from seamless tubing) can be machined or cold-formed to acquire the desired hourglass shape. The thickness of the tubular body 31 can depend upon the material from which it is made and expected conditions in which it will be installed. If it is too thin, the body 31 may too easily deform in the ductwork. If it is too thick, the body 31 may not be able to adequately accommodate axial shifting caused by thermal expansion-contraction. A metal stainless steel tubular body 31, intended for installation in the exhaust system of a typical diesel engine, can have a thickness of between about 0.5 mm and about 1.0 mm, for example.

Figure 5:
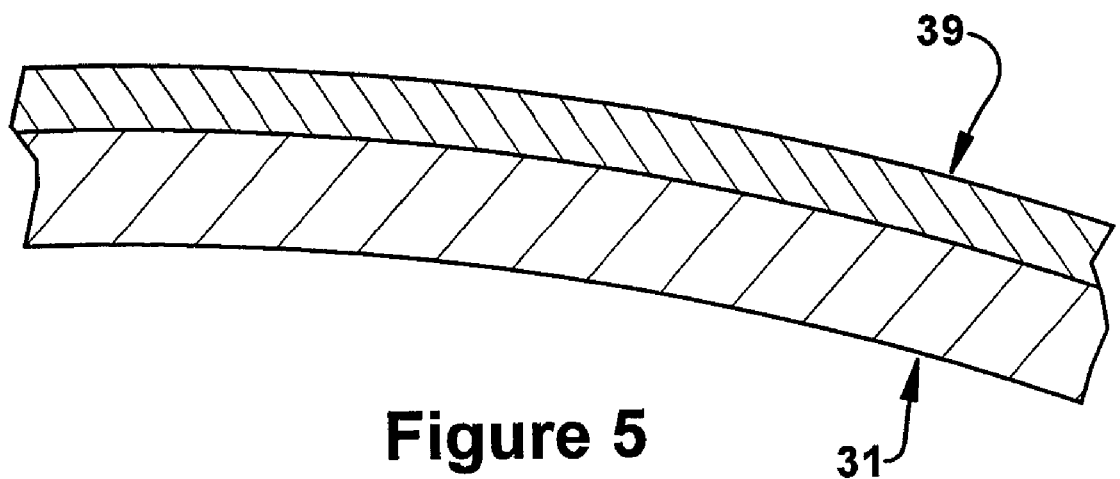
FIG. 5 is a closeup view of the surface of the sealing joint.

As seen in FIG. 5, the tubular body 31 can include a wear-resistant coating 39 on its outer duct-contacting surface.

The coating 39 can comprise a matrix phase including a metal or a metal alloy (e.g., cobalt, nickel, tin, zinc, copper, iron, tungsten, or a combination of two or more thereof and MCrAlY particles dispersed in the matrix (wherein M is chosen from nickel, cobalt, iron, or a combination of two or more thereof). The coating thickness can be from about 25 μm to about 130 μm. Further details of a suitable coating are set forth in U.S. application Ser. No. 12/388,792, the entire disclosure of which is hereby incorporated by reference.

Although the engine 10, the exhaust system 12, the duct pieces 20, and/or the sealing joint 30 have been shown and described with respect to certain embodiments, equivalent alterations and modifications should occur to others skilled in the art upon review of this specification and drawings. If an element (e.g., component, assembly, system, device, composition, method, process, step, means, etc.), has been described as performing a particular function or functions, this element corresponds to any functional equivalent (i.e., any element performing the same or equivalent function) thereof, regardless of whether it is structurally equivalent thereto. And while a particular feature may have been described with respect to less than all of embodiments, such feature can be combined with one or more other features of the other embodiments.

The invention claimed is:

1. A sealing joint comprising a one-piece tubular body; the tubular body having a first axial end portion, a second axial end portion, and a bridge portion extending therebetween;
the first end portion having a coaxially convex outer profile with a maximum outer diameter ($OD_{1max}$);
the second end portion having a coaxially convex outer profile with a maximum outer diameter ($OD_{2max}$); and
the bridge portion having a coaxially concave outer profile with a minimum outer diameter ($OD_{Bmin}$), this minimum outer diameter ($OD_{Bmin}$) being less than the maximum outer diameter ($OD_{1max}$) of the first end portion and less than the maximum outer diameter ($OD_{2max}$) of the second end portion,
wherein the tubular body includes a wear-resistant coating on its outer surface.

2. A sealing joint as set forth in claim 1, wherein the first end portion has a coaxially concave inner profile with a maximum inner diameter of ($ID_{1max}$);
wherein the second end portion has a coaxially concave inner profile with a maximum inner diameter of ($ID_{2max}$); and
wherein the bridge portion has a convex inner profile with a minimum inner diameter ($ID_{Bmin}$), this inner diameter ($ID_{Bmin}$) being less than the maximum inner diameter ($ID_{1max}$) and less than the maximum inner diameter ($ID_{2max}$).

3. A sealing joint as set forth in claim 1, wherein the tubular body has substantially the same thickness throughout its portions, whereby the difference between the maximum outer and inner diameters ($OD_{1max}$-$ID_{1max}$) of the first end portion, the difference between the maximum outer and inner diameters ($OD_{2max}$-$ID_{2max}$) of the second end portion, and the difference between the maximum outer and inner diameters ($OD_{Bmin}$-$ID_{Bmin}$) of the bridge portion are approximately equal.

4. A sealing joint as set forth in claim 1, wherein the first end portion has a minimum outer diameter ($OD_{1min}$), wherein the second end portion has a minimum outer diameter ($OD_{2min}$), and wherein the minimum outer diameter ($OD_{1min}$) of the first end portion and the minimum outer diameter ($OD_{2min}$) of the second end portion are approximately equal.

5. A sealing joint as set forth in claim 1, wherein the bridge portion has a minimum outer diameter ($OD_{Bmin}$) that is less than the minimum outer diameter ($OD_{1min}$) of the first end portion and/or that is less than the minimum outer diameter ($OD_{2min}$) of the second end portion.

6. A sealing joint as set forth in claim 1, wherein the end portions are symmetrical relative to each other about the bridge portion.

7. A sealing joint as set forth in claim 1, wherein the tubular body is symmetrical about a plurality of planes passing through its longitudinal axis.

8. A sealing joint as set forth in claim 1, wherein the tubular body comprises metal or metal alloy.

9. A sealing joint as set forth in claim 1, wherein the tubular body has a thickness of about 0.5 mm to about 1.0 mm.

10. A sealing joint as set forth in claim 1, wherein the coating comprises a matrix phase comprising a metal or a metal alloy; and
    MCrAlY particles dispersed in the matrix, wherein M is chosen from nickel, cobalt, iron, or a combination of two or more thereof.

11. A sealing joint as set forth in claim 10, wherein the matrix phase comprises cobalt, nickel, tin, zinc, copper, iron, tungsten, or a combination of two or more thereof.

12. A sealing joint as set forth in claim 11, wherein the coating has a thickness of from about 25 µm to about 130 µm.

13. A sealing joint as set forth in claim 1, wherein:
    the first end portion has a coaxially concave inner profile with a maximum inner diameter of ($ID_{1max}$) and a minimum outer diameter ($OD_{1min}$);
    the second end portion has a coaxially concave inner profile with a maximum inner diameter of ($ID_{2max}$) and a minimum outer diameter ($OD_{2min}$);
    the bridge portion has a convex inner profile with a minimum inner diameter ($ID_{Bmin}$) and a minimum outer diameter ($OD_{Bmin}$);
    the minimum outer diameter ($OD_{1min}$) of the first end portion and the minimum outer diameter ($OD_{2min}$) of the second end portion are approximately equal;
    the minimum inner diameter ($ID_{Bmin}$) of the bridge portion is less than the maximum inner diameter ($ID_{1max}$) of the first end portion and less than the maximum inner diameter ($ID_{2max}$) of the second end portion; and
    the minimum outer diameter ($OD_{Bmin}$) of the bridge portion is less than the minimum outer diameter ($OD_{1min}$) of the first end portion and/or that is less than the minimum outer diameter ($OD_{2min}$) of the second end portion.

14. A sealing joint as set forth in claim 13, wherein the tubular body has substantially the same thickness throughout its portions, whereby the difference between the maximum outer and inner diameters ($OD_{1max}$-$ID_{1max}$) of the first end portion, the difference between the maximum outer and inner diameters ($OD_{2max}$-$ID_{2max}$) of the second end portion, and the difference between the maximum outer and inner diameters ($OD_{Bmin}$-$ID_{Bmin}$) of the bridge portion are approximately equal.

15. A sealing joint as set forth in claim 14, wherein the end portions are symmetrical relative to each other about the bridge portion.

16. A sealing joint as set forth in claim 14, wherein the tubular body is symmetrical about a plurality of planes passing through its longitudinal axis.

17. A sealing joint as set forth in claim 14, wherein the tubular body comprises metal or metal alloy, and has a thickness of about 0.5 mm to about 1.0 mm.

18. Ductwork comprising a first duct piece, a second duct piece, and the sealing joint set forth in claim 1 interconnecting adjoining ends of the first duct piece and the second duct piece; wherein:
    the first duct piece includes a passage for conveying fluid gas and a female recess, coextensive with the passage, on its adjoining end;
    the second duct piece includes a passage for conveying combustion gas and a female recess, coextensive with the passage on its adjoining end;
    the first end portion of the tubular body is at least partially positioned within the female recess of the first duct piece;
    the second end portion of the tubular body is at least partially positioned with the female recess of the second duct piece; and
    the bridge portion of the tubular body extends across a gap between the adjoining ends of the duct pieces and/or is positioned partially within the female recesses.

19. An engine exhaust system comprising the ductwork set forth in claim 18, wherein combustion gas passes through the passage in the first duct piece, through the passage in the tubular body of the sealing joint, and through the passage in the second duct piece.

* * * * *